United States Patent Office 3,418,383
Patented Dec. 24, 1968

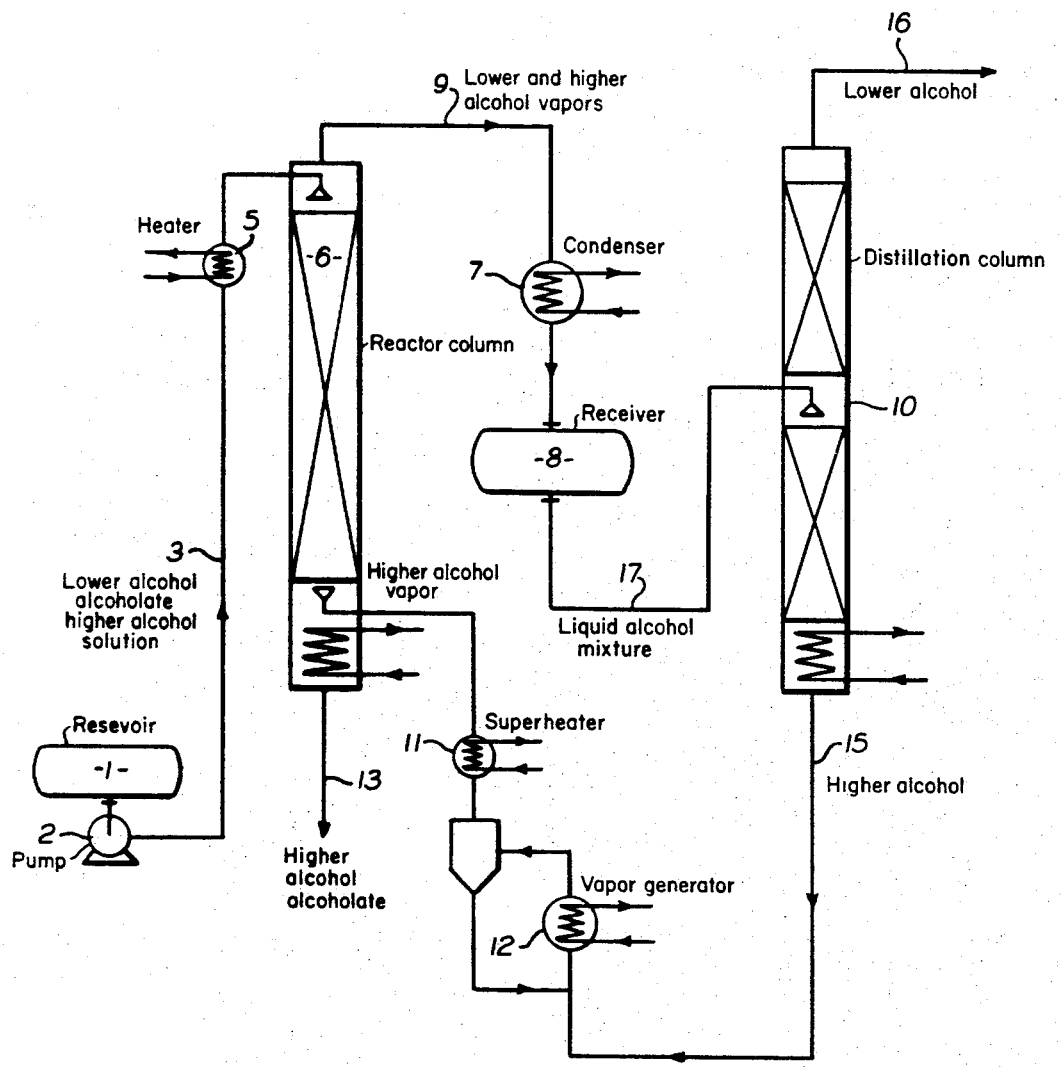

3,418,383
PRODUCTION OF ALKALI METAL ALCOHOLATES
Arnold Lenz, Gerstenkamp, Otto Bleh, Bergheim, and Karl Hass, Niederkassel, Germany, assignors to Dynamit Nobel Aktiengesellschaft
Filed Nov. 8, 1966, Ser. No. 594,333
Claims priority, application Germany, Nov. 10, 1965, D 48,614
9 Claims. (Cl. 260—632)

ABSTRACT OF THE DISCLOSURE

The improved interchange reaction between a lower alcoholate of an alkali metal and a higher alcohol to produce a higher alcoholate of the alkali metal, wherein the interchange reaction is carried out in the presence of vapors of higher alcohols passing through the interchange reaction mass.

---

This invention relates to the production of alkali metal alcoholates. It more particularly refers to the production of such alcoholates by an interchange type of reaction. It further refers to such production which can be carried out continuously.

The general interchange reaction between alkali metal lower alcoholates and higher alcohols to produce alkali metal higher alcoholates and lower alcohol is known. In general, the above reaction is rendered quantitative or virtually quantitative by distilling off the lower alcohol. A summary description of these methods is given in Houben-Weyl, "Methoden der Organischen Chemie," vol. 6, part 2, wherein it is stated that the manufacture of alcoholates of primary alcohols by the above procedure is possible only with $C_4$ or higher alcohols, that the alkali metal alcoholates of secondary alcohols can be prepared only in exceptional cases, and that the manufacture of alcoholates of tertiary alcohols by this realcoholization is not possible.

It is an object of this invention to provide a novel method of carrying out alcoholate interchange reactions.

It is another object of this invention to provide an alcoholate interchange process by which secondary and tertiary alcoholates can be prepared.

It is a further object of this invention to provide a process of producing $C_2$ and $C_3$ alcoholates of alkali metals by interchange reaction.

Other and additional objects of this invention will become apparent from a consideration of this entire specification, including the claims and drawing appended hereto.

In accord with and fulfilling these objects, one aspect of this invention resides in carrying out an alkali metal alcoholate interchange reaction, whereby an alkali metal $C_1$ or $C_2$ alcoholate is reacted with a $C_2$ to $C_{12}$ monohydric higher alcohol of a higher boiling point under the interchange reaction conditions, while passing vaporous higher alcohol through the reaction zone.

According to this invention, $C_2$ to $C_{12}$ aliphatic and cycloaliphatic mono-hydric, primary, secondary and/or tertiary alcohols can be used in this interchange reaction provided that the chosen alcohol has a higher boiling point than the alcoholic moiety of the alkali metal alcoholate reactant has. As used herein, the term higher alcohol means the material which is reacted in its alcohol state to produce its alkali metal alcoholate state.

Exemplary of the higher alcohols which are useful in this invention are the known primary aliphatic alcohols e.g., ethanol, n-propanol, n-butanol, 2 - methylpropanol-(1), n-pentanol, 2 - methylbutanol - (4), 2 - methylbutanol - (1), 2,2 - dimethylpropanol-(1), n-hexanol, 2-ethylhexanol-(1), lauryl alcohol, etc.; the secondary alcohols e.g., isopropanol, butanol - (2), pentanol - (2), pentanol-(3), 2 - methylbutanol - (3) and the like; and the tertiary alcohols, e.g., 2-methylpropanol-(2), 2-methylbutanol-(2) and the like. In addition to the univalent aliphatic alcohols, cycloaliphatic alcohols can be interchanged such as: cyclopropanol, cyclobutanol, cyclopentanol, cyclohexanol, and the alkyl-substituted derivatives thereof having a total of up to 12 carbon atoms.

Both the alkali alcoholates of methanol and those of ethanol can be used as starting products, and the alkali metal of the alcoholate can be sodium, potassium and lithium, and, of course, cesium and rubidium as well.

The process of the invention is to be explained by means of the annexed drawing which is a flow diagram of the process.

A solution consisting of a alkali metal $C_1$–$C_2$ alcoholate and a higher alcohol is placed in a reservoir 1. This solution is fed by a pump 2 through a line 3 and through a heater 5 to the head of a column 6. At the same time, vapor of the higher alcohol is fed to the sump of a column 6. A vapor generator 12 and a superheater 11 are provided. The vapors coming through the line 9 from the column 6 are liquefied in a condenser 7. These vapors consist of a mixture of a lower and a higher alcohol. A receiver 8 for the resulting condensate is provided. The alcohol mixture is fed through a line 17 to a column 10 where it is again broken down in a conventional distillation manner into lower and higher alcohol components. The low-boiling alcohol is drawn off at the top through a line 16. The alcohol with the higher boiling point is fed back into the process through a line 15. The heating means located in the sump of the column 6 provides for a constant concentration of the alcoholate solution of the higher alcohol, which can be taken out through a line 13 and from which the alcoholate can be recovered in a conventional manner, e.g., by extracting the higher alcohol or by evaporation, and can be purified.

The solution from the reservoir 1 is fed to the head of the column 6, preferably at the boiling temperature of the solution. The concentration of the alkali metal alcoholate in the higher alcohol can be varied within wide limits. The upper limit of concentration is determined by the solubility of the alkali alcoholate in the higher alcohol at the storage temperature involved.

The sump temperature of the column 6 is determined by the concentration of the desired alkali alcoholate and by the pressure in the sump of the column. The temperature is advantageously made such that the solubility of the alcoholate is not exceeded.

The temperature of the higher alcohol vapor introduced into the column 6 is advantageously governed by the energy balance of the reaction. The quantity of the higher alcohol is controlled by the kind of column used and the equilibrium ratio of the reactions involved.

By the appropriate choice of the column, the realcoholization with primary as well as with secondary and tertiary alcohols in conjunction with the measures prescribed by the invention can be rendered quantitative or virtually quantitative in a single passage.

The important advantage of the process of the invention lies in the fact that alcoholates both of primary and of secondary and tertiary alcohols can be made.

The products manufactured according to the invention are well known and have known utility as catalysts as well as for other purposes.

The following examples are given by way of illustration of the instant invention and are in no way limiting thereon.

Example 1.—Sodium-n-propylate

At normal pressure, a solution of 3.5 moles of sodium methylate and approximately 22.61 moles of n-propanol, preheated to 94° C., were fed per hour to the head of column 6 (30 mm. diam., 2 m. long, well insulated, filled with glass spirals 2 mm. long). The bottom end of the column was fed with 13.3 moles per hour of n-propanol vapor which had been raised to approximately 120° C., by superheating. The sump product was kept at a temperature of 110° C. Approximately 3.5 moles per hour of sodium-n-propylate, dissolved in approximately 19.11 moles of n-propanol were taken per hour from the sump. Sodium-n-propylate with a purity of 98–99% was obtained from this solution by removing the n-propanol by evaporation. Approximately 3.5 moles of methanol and 13.3 moles of propanol were drawn per hour from the head of column 6 in the form of vapor with a temperature of about 95° C. This mixture can be fed directly or after condensation to column 10 for separation into its components.

Example 2.—Sodium-iso-propylate

Analogously to Example 1, a mixture of 1.7 moles of NaOCH$_3$ dissolved in 13.76 moles of isopropanol and preheated to 80–82° C., and 31.46 moles of isopropanol vapor superheated to 92–95° C., was fed into column 6 (50 mm. diam., with 40 vapor baffles). The sump of the column was kept at about 86° C. At the head of the column, approximately 1.7 moles of methanol vapor and about 31.46 moles of isopropanol vapor having a temperature of about 82° C. were drawn off. In the sump were found approximately 1.7 moles of sodium isopropylate together with approximately 12.06 moles of isopropanol. The further processing of the head and sump products can be performed in a manner analogous to Example 1. Sodium isopropylate with a purity of 92–98% was obtained, which was further purified by recrystallization from anhydrous isopropanol.

Example 3.—Potassium tert-butylate

Analogously to Example 1, a solution of 0.73 moles of KOCH$_3$ in 5.76 moles of tert-butanol, preheated to about 135° C., and 40.5 moles of tert-butanol vapor superheated to about 145° C., were fed per hour into column 6, which was 30 mm. in diameter, 2 m. long, thermally insulated and filled with glass spirals 2 mm. long. The column pressure was held at 5 atmospheres overpressure by appropriate throttling of the head product. The head temperature then amounted to about 137 to 138° C. The quantity of head product was 0.65 mole of methanol and 40.5 moles of tert-butanol per hour. The sump temperature was maintained at about 142° C. From the sump substantially about 0.65 mole of potassium tert-butylate and a small amount of KOCH$_3$ (about 0.08 mole), both dissolved in about 5.11 moles of tert-butanol, were withdrawn per hour. The further processing of the head and sump products can be performed analogously to Example 1.

The solid product obtained by evaporating away the tert-butanol consists to 92–93% of potassium tert-butylate and can easily be further purified by sublimation.

While it is preferred to utilize as the higher alcohol vapor the same alcohol as is being subjected to the interchange reaction, this is not absolutely essential. In the event that different alcohols are so used, a mixed product will probably be obtained which may be resolved or utilized as such.

The process of this invention is suitably carried out at atmospheric, superatmospheric or subatmospheric pressure as desired.

What is claimed is:

1. In the process of producing alkali metal higher alcoholates by the interchange reaction between an alkali metal methoxide or ethoxide with a higher alkanol having about 2 to 12 carbon atoms therein in a reaction zone, wherein the boiling point of said higher alcohol is higher than the boiling point of the alcoholic moiety of said reactant alkali metal alcoholate; the improvement which comprises passing vaporous higher alcohol upwardly, in countercurrent fashion, through heated alkoxide in solution in a higher alkanol reactant, which reactant is at about its boiling point and which alkanol reactant passes downwardly with respect to said vaporous higher alcohol.

2. The improved process claimed in claim 1, wherein said higher alcohol vapor is superheated.

3. The improved process claimed in claim 1, wherein said higher alcohol vapor and said higher aclohol reactant are the same.

4. The improved process claimed in claim 1, wherein said higher alcohol is at least one selected from the group consisting of ethanol, n-propanol, n-butanol, 2-methylpropanol-(1), n-pentanol, 2-methylbutanol-(4), 2-methylbutanol-(1), 2,2-dimethylpropanol-(1), n-hexanol, 2-ethylhexanol-(1), lauryl alcohol, isopropanol, butanol-(2), pentanol-(2), pentanol-(3), 2-methylbutanol-(3), 2-methylpropanol-(2) and 2-methylbutanol-(2).

5. The improved process claimed in claim 1, wherein said alkali metal is at least one selected from the group consisting of sodium, potassium, lithium, cesium and rubidium.

6. The improved process claimed in claim 1 carried out continuously.

7. The improved process claimed in claim 6, wherein a mixture of higher alkanol, methanol or ethanol are recovered, resolved and the higher alcohol recycled to the reaction zone.

8. The improved process claimed in claim 1 carried out at subatmospheric pressure.

9. The improved process claimed in claim 1 carried out at superatmospheric pressure.

References Cited

UNITED STATES PATENTS

| | | |
|---|---|---|
| 2,593,314 | 4/1952 | Kimberlin. |
| 2,726,142 | 12/1955 | Reeve _____ 23—154 |
| 2,877,274 | 3/1959 | Kramis. |
| 3,100,750 | 8/1963 | Bailey et al. _____ 260—635 |

OTHER REFERENCES

Turova et al., "Russian Chemical Review," vol. 34, (Mar. 1965), pp. 161–165.

LEON ZITER, *Primary Examiner.*

J. E. EVANS, *Assistant Examiner.*

U.S. Cl. X.R.

260—642, 617, 631, 643